United States Patent [19]

Hanisch et al.

[11] Patent Number: 4,771,095

[45] Date of Patent: Sep. 13, 1988

[54] ALUMINUM HYDROXIDE FILLED CASTING RESINS ON A BASIS OF METHACRYLIC ACID ESTERS, AND PLASTIC OBJECTS AND MOLDINGS MANUFACTURED THEREFROM

[75] Inventors: Horst Hanisch, Hennef/Sieg; Jürgen Amort, Troisdorf-Sieglar; Ute Klapdor, Troisdorf; Hermann Peeters, Siegburg, all of Fed. Rep. of Germany

[73] Assignee: Dynamit Nobel AG, Troisdorf, Fed. Rep. of Germany

[21] Appl. No.: 74,276

[22] Filed: Jul. 16, 1987

[30] Foreign Application Priority Data

Jul. 17, 1986 [DE] Fed. Rep. of Germany ....... 3624142

[51] Int. Cl.$^4$ .......................... C08L 33/10; C08K 3/22; C08K 5/54
[52] U.S. Cl. ...................................... 524/437; 428/15; 523/171; 524/533; 524/786
[58] Field of Search .................. 428/15; 524/437, 430, 524/786, 533; 523/171

[56] References Cited

U.S. PATENT DOCUMENTS

| 3,562,007 | 2/1971 | Bockstie | 428/215 |
| 3,754,989 | 8/1973 | Bockstie | 428/331 |
| 4,159,977 | 7/1979 | Hsieh | 524/437 |
| 4,221,697 | 9/1980 | Osborn et al. | 428/331 |
| 4,251,576 | 2/1981 | Osborn et al. | 524/786 |
| 4,413,089 | 11/1983 | Gavin et al. | 524/437 |
| 4,643,921 | 2/1987 | Terabe et al. | 523/171 |
| 4,678,819 | 7/1987 | Sasaki et al. | 523/171 |

FOREIGN PATENT DOCUMENTS

| 3447114 | 4/1986 | Fed. Rep. of Germany. |
| 0107764 | 3/1987 | Fed. Rep. of Germany. |
| 0104621 | 9/1978 | Japan ................................ 523/171 |

Primary Examiner—Herbert J. Lilling
Attorney, Agent, or Firm—Felfe & Lynch

[57] ABSTRACT

Disclosed is a casting resin of reduced viscosity based on methacrylic acid esters with a high content of aluminum hydroxide as filler containing a mixture of at least one organosilicon compound with a functional group, at least one silicic acid ester, and at least one organic metallic acid compound of metals of Groups IVB and/or VB of the Periodic Table of the Elements. The functional group of the organosilicon compound is ethylenically unsaturated and bound to the silicon atom either directly or by alkylene groups. The casting resins of the invention have improved working qualities. Plastic objects and moldings manufactured from these resins have decidedly improved use properties.

20 Claims, No Drawings

ALUMINUM HYDROXIDE FILLED CASTING RESINS ON A BASIS OF METHACRYLIC ACID ESTERS, AND PLASTIC OBJECTS AND MOLDINGS MANUFACTURED THEREFROM

BACKGROUND OF THE INVENTION

The present invention is in a casting resin on the basis of methacrylic acid ester, filled with aluminum hydroxide or hydrated aluminum oxide, and plastic objects and moldings manufactured therefrom.

Plastic objects and moldings made from casting resins filled with aluminum hydroxide or hydrated aluminum oxide on a basis of methacrylic acid esters are known (cf. U.S. Pat. Nos. 3,644,735 and 3,847,865). Such plastic objects and moldings display fire-resistance, special optical properties, and resistance to acids.

It is furthermore known to add organic silicon compounds and other additives to casting resins on a basis of methacrylic acid esters which are filled with silicatic fillers. In this manner the working properties of these resins and the practical properties of the plastic objects and moldings made therefrom are decidedly improved (cf. DE-PS No. 24 49 656 and EP-A No. 0 107 764).

The working properties of casting resins filled with aluminum hydroxide or hydrated aluminum oxide on a basis of methacrylic acid esters and the practical properties of plastic objects and moldings made therefrom are either not improved or are insufficiently improved by known organosilicon compounds and other additives.

A high degree of filling is necessary, combined with low viscosity for the broad application of casting resins filled with aluminum hydroxide or hydrated aluminum oxide on a basis of methacrylic acid esters. A high degree of filling guarantees the fire-proof quality of the plastic objects and moldings made from the resins and reduces the shrinkage in the curing of the resins to an acceptable degree. At the same time, low viscosity is necessary in order to manufacture geometrically attractive plastic objects and moldings. Furthermore, for a broad application, it is necessary that plastic objects and moldings, manufactured from the casting resins retain their practical properties, such as resistance to boiling, acid resistance and mechanical properties, even under permanent stress. In many cases, a higher level of the mechanical properties is also necessary.

SUMMARY OF THE INVENTION

It is an object of the invention to provide an additive for the known casting resins filled with aluminum hydroxide or hydrated aluminum oxide on a basis of methacrylic acid esters which is both rheologically active and also acts as an adhesion mediator. This and other objects are achieved by the casting resins of the invention.

The casting resins of the invention on the basis of methacrylic acid esters contain aluminum hydroxide or hydrated aluminum oxide and a mixture of at least one each of (a) an organosilicon compound with an ethylenically unsaturated group;

(b) a silicic acid ester; and (c) an organic metallic acid compound, especially a metallic acid ester, a metallic acid complex compound or a metallic acylate of metals of Groups IV and/or V of the Periodic System.

The casting resins filled with aluminum hydroxide or hydrated aluminum oxide according to the invention are pourable already at room temperature and surprisingly have, in the uncured state, viscosities which are considerably lower than the viscosities of the known casting resins without the addition of the claimed components. The plastic objects and moldings produced from the casting resins according to the invention have decidedly better mechanical and optical properties than similar casting resins without the addition of the claimed components, which remain virtually unaltered even when exposed to boiling water for prolonged periods of time. If only one of the components of the claimed mixture is contained in the casting resin, the latter exhibits the known inadequate working properties of the casting resins filled with aluminum hydroxide or hydrated aluminum oxide. Plastic objects and moldings made from these resins have the known unsatisfactory practical properties.

The amount of organosilicon compound, silicic acid ester and organic metallic acid compound that is to be used is very small. Practically, it is related to the aluminum hydroxide or hydrated aluminum oxide content of the casting resin, which is variable within wide limits. The organosilicon compound is generally used in amounts between 0.2 and 1.5 wt.-%, the silicic acid ester in amounts between 0.2 and 2 wt.-%, and the organic metallic acid compound in amounts between 0.2 and 0.8 wt.-%. While the content of the individual compounds or groups of compounds in the casting resin can be greater, this does not result in any substantial improvement of the desired effect.

From the range of these amounts it is to be concluded that the ratio of organosilicon compound to silicic acid ester and organic metallic acid compound can be varied within the given limits. The optimum is to be determined for a specific casting resin by preliminary experiments.

Organosilicon compounds having an ethylenically unsaturated group, which are also called unsaturated organosilanes, are those tri- and dialkoxysilanes whose organofunctional moiety contains a carbon-carbon double bond. The silicon atom is directly linked to a carbon atom of the carbon-carbon double bond as for example, in the vinyltrialkoxysilanes. The silicon atom, however, can also be separated from the carbon-carbon double bond by one or more carbon atoms, as for example in the allyl trialkoxysilanes or the gamma-methacryloxypropyltrialkoxysilanes. The corresponding dialkoxysilanes can also be used, in which case either a second organofunctional moiety is bound by a CC double bond (which is generally the same moiety as the first organofunctional moiety), or an alkyl moiety, which preferably has 1 to 4 carbon atoms. The carbon chain can be interrupted by an ether-oxygen atom.

Examples of organosilicon compounds with an ethylenically unsaturated group are:
vinyltrimethoxysilane, vinyltriethoxysilane,
vinyl-tris-methoxyethoxysilane, divinyldimethoxysilane,
vinylmethyldimethoxysilane,
gamma-methacryloxypropyltrimethoxysilane,
gamma-methacryloxypropylmethyldimethoxysilane,
gamma-methacryloxypropyl-tris-methoxyethoxysilane.

The usable silicic acid esters include the monomeric tetraalkoxysilanes and their polymers. The alkoxy groups have preferably up to 4 carbon atoms. The carbon chain can be interrupted by an ether oxygen atom.

The polymeric alkoxysilanes are to be understood to include the products obtained by partial condensation of the monomeric tetraalkoxysilanes.

The compounds of this group which can be used according to the invention include tetraethylorthosilicate, tetrapropylorthosilicate, tetraethylglycolsilicate, ethylpolysilicate, which is also known as ethylsilicate 40, and has a silicon dioxide content of about 40%.

The usable organic metallic acid compounds include the esters of the metallic acids of metals of Groups IVB and VB of the Periodic Table of the elements, principally titanic, zirconic and vanadic acid esters. The ester component can have 1 to 18 carbon atoms and can be derived either from aliphatic alcohols or from phenols which may be alkyl-substituted if desired. Mixed esters can also be used.

The compounds that can be used according to the invention include methyl titanate, ethyl titanate, butyl titanate, butyl polytitanate, nonyl titanate, cetyl titanate, tributyloleyl titanate, cresyl titanate, cresyl polytitanate, propyl zirconate, butyl zirconate, ethyl vanadate and butyl vanadate.

From this listing it appears that the corresponding polymeric esters can also be used if they are stable. Mixed esters that can be used also include those in which one or more alkoxy groups are replaced by a complexing agent which is bound to the central metal atom through principal and/or secondary valences. Examples of such complexing agents are acetyl acetone, acetic acid ester or ethanolamine, contained for example in diisopropoxy-bis-(2,4-pentandionato)-zirconium or diisopropoxy-bis-(2,4-pentanedionato)-titanium(IV), which is also known by the name of titanium acetylacetonate.

Other metallic acid complex compounds which no longer contain an ester grouping can also be used, such as tris(2,4-pentanedionato)-vanadium(III) or oxy-bis-(2,4-pentanedionato)-vanadium (IV), for example.

The organic metallic acid compounds which can be used include the acylates of metals of Groups IVB and VB of the Periodic Table, principally titanium, zirconium and vanadium acylates. The acylate radical can be derived from straight-chain or branched aliphatic or cycloaliphatic or aromatic carboxylic acids with up to 20 carbon atoms. The carbon chain can be saturated or unsaturated, and may contain substituents such as hydroxyl groups, for example. The acylates also include products which contain alkoxy and acylate groups on the metal atom, or polymers which can be considered to be partial condensates of the monomeric acylates. Examples of such acylates according to the invention are: titanium monopropoxytristearate, titanium diisopropoxydistearate, titanium tripropoxyacetate, zirconium tetrabenzoate, zirconium diisopropoxydipropionate, and polymeric dioxovanadiummonobutyrate.

Organic metallic acid compounds with little inherent color are preferentially used.

The resin component of the casting resins according to the invention is a solution of 10 to 30 wt.-% of a polymer in methylmethacrylate. The polymer is either a homopolymer of methylmethacrylate or a copolymer of methylmethacrylate with unsaturated comonomers, or mixtures of those. Examples of unsaturated comonomers are vinyl-acetate, styrene, methylacrylate, ethylacrylate, butylacrylate, cyclohexylacrylate, ethylmethacrylate, butylmethacrylate or cyclohexylmethacrylate. The polymerization mass can also contain polyunsaturated crosslinking agents, such as ethylene dimethacrylate, propylene dimethacrylate, polyethyleneglycol dimethacrylate, divinylbenzene, triallylcyanurate or diallylphthalate. The resins or resin mixtures used for the casting resins according to the invention are known in themselves (cf. U.S. Pat. Nos. 3,644,795 and 3,847,865).

The casting resins according to the invention contain finely divided aluminum hydroxide or hydrated aluminum oxide as filler. The average grain size of the filler is less than 100 microns. Aluminum hydroxide or hydrated aluminum oxide is used with an average particle diameter of 5 to 40 microns.

The casting resin according to the invention contains the filler in an amount of at least 20 wt.-% up to a maximum of 80 wt.-%. The content preferably is between 50 and 70 wt.-%.

Reinforcing substances in the fiber form, such as glass fibers or calcium titanate fibers, can also be used. Pigmentation with inorganic or organic pigments is also possible.

The production of the casting resins filled with aluminum hydroxide or hydrated aluminum oxide can be accomplished by different methods, which are explained by way of example below:

(a) The silicic acid ester and a portion of the organic metallic acid compound are admixed in a ratio of 2:1 to 6:1, preferably about 4:1, by weight, to the previously prepared resin component. Then the aluminum hydroxide or hydrated aluminum oxide is dispersed into the resin thus modified. The organosilicon compound with an additional content of the organic metallic acid compound is then admixed in a ratio of 3:1 to 7:1, preferably about 5:1 by weight. Then follows the addition of pigments, if used.

(b) The organosilicon compound, silicic acid ester and organic metallic acid compound are admixed with the resin. Then the aluminum hydroxide or hydrated aluminum oxide is dispersed into the modified resin. Then follows the addition of pigments, if any.

(c) The organic metallic acid compound, e.g., zirconium acetyl acetonate, is mixed with aluminum hydroxide, e.g., in a ratio of 1:1, and worked into the resin solution. Then additional aluminum hydroxide or hydrated aluminum oxide is dispersed into the modified resin. Immediately thereafter a preparation of silicic acid ester and organosilicon compound is added. Then follows the addition, if any, of pigments.

It is desirable to avoid adding setting catalysts and any accelerators to the casting resins until they are about to be manufactured into plastic objects and moldings.

The setting of the casting resins is performed in a manner known in itself, e.g., by the addition of peroxides and any activators or accelerators, according to whether the setting is to be performed at room temperature or at elevated temperature.

The casting resins filled with aluminum hydroxide or hydrated aluminum oxide can be used for the production of many types of objects or moldings, such as, for example, boards, kitchen sinks, and sanitary products such as wash basins, shower pans or bases and bathtubs.

EXAMPLE 1

Casting resins and test plates made from them were prepared as follows:

3.36 g of tetraethyl orthosilicate and 0.84 g of tetrabutyl zirconate were dissolved in 133.7 g of a 20% solution of a methylmethacrylate homopolymer in monomer with a polyunsaturated crosslinking agent. Then, using a whisk at 700 to 800 rpm, 210 g of aluminum hydroxide (average grain size 5 microns) were dispersed in the solution in the course of about 15 minutes. After another 15 minutes of mixing, again 0.35 g of tetrabutylzirconate plus 1.75 g of gamma-methacryloxypropyltrimethoxysilane were gradually added. Then 1.4 g of ultramarine blue was stirred in for color.

The casting resins were stored for 2 hours at 20° C. Then the viscosity of the casting resin was measured with a Brookfield RV Viscosimeter at 10 and 50 rpm (spindle 5).

After standing for a total of 5 hours, 0.7 g of a peroxide catalyst and 0.35 g of an accelerator were stirred in and a plate measuring 200×200×4 mm was cast. The plate set at room temperature within 20 minutes. Then it was cured for another 14 hours at 80° C.

To determine the flexural strength according to DIN 53 452 and the impact strength to DIN 53 453, standard test bodies measuring 50×6×4 mm were sawed out. The test was performed directly and after 6 hours of aging in water at 100° C.

COMPARISON EXAMPLES

Three kinds of test plates were prepared, according to the method of Example 1, using:
(A)
140 g of resin
210 g of aluminum hydroxide (average grain size 5 microns) and
1.4 g of pigment,
(B)
137.9 g of resin
210 g of aluminum hydroxide (average grain size 5 microns)
0.35 g of tetrabutyl zirconate
1.75 g of methacryloxypropyltrimethoxysilane
1.4 g of pigment,
(C)
132 g of 20% resin solution
220 g of aluminum hydroxide (37 microns average grain size)
1.4 g of pigment.
The values obtained by measurement are given in Table 1, with the exception of plate C.

EXAMPLE 2

By the method of Example 1, an additional test plate was made, except that both 3.36 g of tetraethylorthosilicate and 0.84 g of tetrabutyl zirconate as well as 0.35 g of tetrabutyl zirconate and 1.75 g of gamma-methacryloxypropyltrimethoxysilane were added to the resin solution before the dispersal of the aluminum hydroxide.

EXAMPLE 3

By the method of Example 1, an additional test plate was made, except that 3.36 g of ethyl polysilicate containing about 40 wt.-% of silicon dioxide was used instead of 3.36 g of tetraethyl orthosilicate.

EXAMPLE 4

By the method of Example 1, an additional test plate was made, except that 1.26 g of a mixture of 1 part zirconium acetylacetonate and 1 part of aluminum hydroxide was stirred into 130.8 g of the resin solution, and then 210 g of aluminum hydroxide with an average particle diameter of 5 microns was dispersed into the mixture, and then a solution of 2.52 g of tetraethyl orthosilicate, 2.10 g of gamma-methacryloxypropyltrimethoxysilane and 4.62 g of methylmethacrylate was added.

The test results of Examples 2 to 4 are listed in Table 2.

EXAMPLE 5

By the method of Example 1 an additional test plate was made by dissolving 3.52 g of tetraethyl orthosilicate and 0.88 g of tetrabutyl zirconate in 125.4 g of resin solution. Instead of 210 g of aluminum hydroxide with an average particle diameter of 5 microns, 220 g of aluminum hydroxide with an average particle diameter of 37 microns was dispersed into the solution. Then 0.37 g of tetrabutyl zirconate and 1.83 g of gamma-methacryloxypropyltrimethoxysilane was added.

EXAMPLE 6

By the method of Example 1, an additional test plate was made, except that 1.26 g of a mixture of 1 part zirconium acetylacetonate and 1 part aluminum hydroxide was stirred into 122.3 g of the resin solution; then 220 g of aluminum hydroxide with an average particle diameter of 37 microns was dispersed into it, and then a solution of 2.64 g of tetraethylorthosilicate, 2.2 g of gamma-methacryloxypropyltrimethoxysilane and 4.84 g of methylmethacrylate was added.

The test results for Examples 5 and 6 and for plate C are listed in Table 3.

TABLE 1

| | CASTING RESIN VISCOSITY (mPa/s) | | TEST PLATE | | | |
| | | | FLEXURAL STRENGTH (N/mm$^2$) | | IMPACT TOUGHNESS (kJ/m$^2$) | |
| EXAMPLE | 10 rpm | 50 rpm | DIRECT | 6 h 100. C H$_2$O | DIRECT | 6 h 100. C H$_2$O |
| --- | --- | --- | --- | --- | --- | --- |
| 1 | 5600 | 4900 | 100 | 90 | 4.6 | 3.9 |
| A (FOR COMPARISON) | 13200 | >8000 | 79 | 54 | 3.1 | 1.8 |
| B (FOR COMPARISON) | 6000 | 4700 | 100 | 68 | 3.9 | 2.8 |

TABLE 2

| | CASTING RESIN VISCOSITY (mPa/s) | | TEST PLATE | | | |
| | | | FLEXURAL STRENGTH (N/mm$^2$) | | IMPACT TOUGHNESS (kJ/m$^2$) | |
| EXAMPLE | 10 rpm | 50 rpm | DIRECT | 6 h 100. C H$_2$O | DIRECT | 6 h 100. C H$_2$O |
| --- | --- | --- | --- | --- | --- | --- |
| 2 | 4200 | 4000 | 107 | 92 | 4.4 | 4.0 |
| 3 | 6200 | 4500 | 103 | 90 | 3.9 | 3.9 |

TABLE 2-continued

| EXAMPLE | CASTING RESIN VISCOSITY (mPa/s) | | TEST PLATE | | | |
|---|---|---|---|---|---|---|
| | | | FLEXURAL STRENGTH (N/mm²) | | IMPACT TOUGHNESS (kJ/m²) | |
| | 10 rpm | 50 rpm | DIRECT | 6 h 100. C H₂O | DIRECT | 6 h 100. C H₂O |
| 4 | 5100 | 3600 | 103 | 89 | 4.4 | 3.7 |

TABLE 3

| EXAMPLE | CASTING RESIN VISCOSITY (mPa/s) | | TEST PLATE | | | |
|---|---|---|---|---|---|---|
| | | | FLEXURAL STRENGTH (N/mm²) | | IMPACT TOUGHNESS (kJ/m²) | |
| | 10 rpm | 50 rpm | DIRECT | 6 h 100. C H₂O | DIRECT | 6 h 100. C H₂O |
| 5 | 8200 | >8000 | 77 | 60 | 3.4 | 2.4 |
| 6 | 5400 | 5000 | 85 | 76 | 3.4 | 3.2 |
| C (FOR COMPARISON) | 14800 | >8000 | 62 | 53 | 2.1 | 1.7 |

It will be understood that the specification and examples are illustrative but not limitative of the present invention and that other embodiments within the spirit and scope of the invention will suggest themselves to those skilled in the art.

We claim:

1. A casting resin comprising: a hardenable fluid of 10 to 30 wt.-% of a methylmethacrylate polymer in methylmethacrylate containing 20 to 80 wt.-% of a finely divided aluminum hydroxide or hydrated aluminum oxide and a mixture of (a) at least one organosilicon compound with a ethylenically unsaturated double bond, (b) at least one silicic acid ester, and (c) at least one organic metallic acid compound of metals of Groups IVB and/or VB of the Periodic System of the Elements.

2. The casting resin of claim 1 wherein the least one organosilicon compound is a 3-methacryloxypropyl-trialkoxysilane.

3. The casting resin of claim 1 wherein the least one organosilicon compound is vinyl trialkoxysilane.

4. The casting resin of claim 1 wherein the least one silicic acid ester is tetraethyl orthosilicate.

5. The casting resin of claim 1 wherein silicic acid ester is ethyl polysilicate with a silicon dioxide content of approximately 40%.

6. The casting resin of claim 1 wherein the organic metallic acid compound is selected from the group of the esters of titanic acid, vanadic acid and zirconic acid.

7. The casting resin of claim 1 wherein the organic metallic acid compound is a metallic acid complex.

8. The casting resin of claim 7 wherein the metallic acid complex compound is zirconium tetraacetylacetonate.

9. The casting resin of claim 1 containing 0.1 to 4 wt.-% of the organosilicon compound.

10. The casting resin of claim 1 containing 0.1 to 5 wt.-% with respect to the content of the filler of the silicic acid ester.

11. The casting resin of claim 1 containing 0.1 to 2 wt.-% with respect to the content of the filler of the organic metallic acid compound.

12. The casting resin of claim 1 wherein the fluid contains polymer in methylmethacrylate.

13. The casting resin of claim 12 wherein the polymer is either a homopolymer of methylmethacrylate or a copolymer of methylmethacrylate with unsaturated comonomers, such as vinyl acetate, styrene, methylacrylate, ethylacrylate, butylacrylate, cyclohexylacrylate, ethylmethacrylate, butylmethacrylate or cyclohexylmethacrylate.

14. The casting resin of claim 1 containing reinforcing fibers.

15. The casting resin of claim 1 wherein the organic metallic compound is a metallic acylate of metals of Groups IV and/or VB of the Periodic System of the Elements.

16. A plastic article of the casting resin of claim 1.

17. A molding of the casting resin of claim 1.

18. The casting resin of claim 9 containing 0.2 to 1.5 wt.-% of the organosilicon compound.

19. The casting resin of claim 10 containing 0.2 to 2.0 wt.-% with respect to the content of the filler of the silicic acid ester.

20. The casting resin of claim 11 containing 0.2 to 0.8 wt.-% with respect to the content of the filler of the organic metallic acid compound.

* * * * *

UNITED STATES PATENT AND TRADEMARK OFFICE
CERTIFICATE OF CORRECTION

PATENT NO. : 4,771,095

DATED : September 13, 1988

INVENTOR(S) : Horst Hanisch et al

It is certified that error appears in the above-identified patent and that said Letters Patent is hereby corrected as shown below:

Column 1, line 15, "3,644,735" should read
--3,644,795--.

Column 1, line 25, "EP-A No. 0 107 764" should read
--EP-A1 0 107 764--.

Signed and Sealed this

Thirteenth Day of March, 1990

Attest:

JEFFREY M. SAMUELS

Attesting Officer

Acting Commissioner of Patents and Trademarks